United States Patent [19]

Le Blanc et al.

[11] Patent Number: 5,029,777
[45] Date of Patent: Jul. 9, 1991

[54] SEAT HARNESS FOR PARACHUTE OF THE TYPE HAVING A FLEXIBLE WING

[75] Inventors: Michel Le Blanc, Annecy; Paul Amiel, Seynod, both of France

[73] Assignee: Laser-Lab, Annecy le Vieuvx, France

[21] Appl. No.: 285,035

[22] Filed: Dec. 16, 1988

[30] Foreign Application Priority Data

Dec. 21, 1987 [FR] France .................. 87 18331

[51] Int. Cl.$^5$ .................. B64D 17/30; B64D 17/34
[52] U.S. Cl. .................. 244/151 R; 244/902; 244/152
[58] Field of Search ............ 244/142, 145, 146, 152, 244/151 R, 147, 900, 901, 902, 903, 904, 16

[56] References Cited

U.S. PATENT DOCUMENTS

| 544,816 | 8/1895 | Lilienthal | 244/16 |
|---|---|---|---|
| 3,289,976 | 12/1966 | Lemoigne | 244/152 |
| 3,315,921 | 4/1967 | Riley et al. | 244/152 |
| 3,433,441 | 3/1969 | Cummings | 244/152 |
| 3,700,191 | 10/1972 | Page | 244/16 |
| 4,209,148 | 6/1980 | Lemoigne | 244/152 |
| 4,424,945 | 1/1984 | Dell | 244/13 |
| 4,860,970 | 8/1989 | Roselli | 244/16 |

FOREIGN PATENT DOCUMENTS

| 0109448 | 5/1984 | European Pat. Off. . | |
| 2800429 | 7/1979 | Fed. Rep. of Germany | 244/16 |
| 2234188 | 1/1975 | France . | |
| 2490587 | 3/1982 | France . | |

Primary Examiner—Galen Barefoot
Attorney, Agent, or Firm—Sandler, Greenblum & Bernstein

[57] ABSTRACT

Retention apparatus for a parachutist to a parachute of the type having a flexible wing having casings. The apparatus includes a retention assembly adapted to retain the parachutist, and a device for piloting permitting the parachutist to modify the shape of the aerodynamic surface plane by displacement of his center of gravity G.

57 Claims, 7 Drawing Sheets

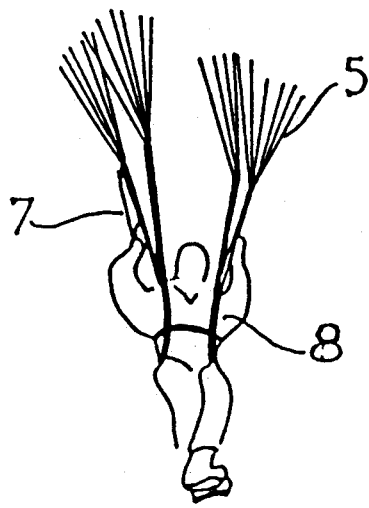
PRIOR ART
FIG 1
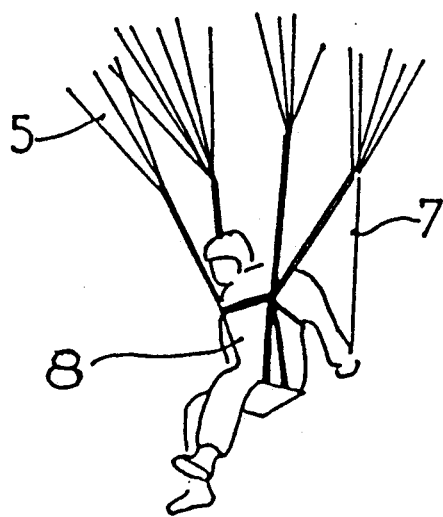
PRIOR ART
FIG 2
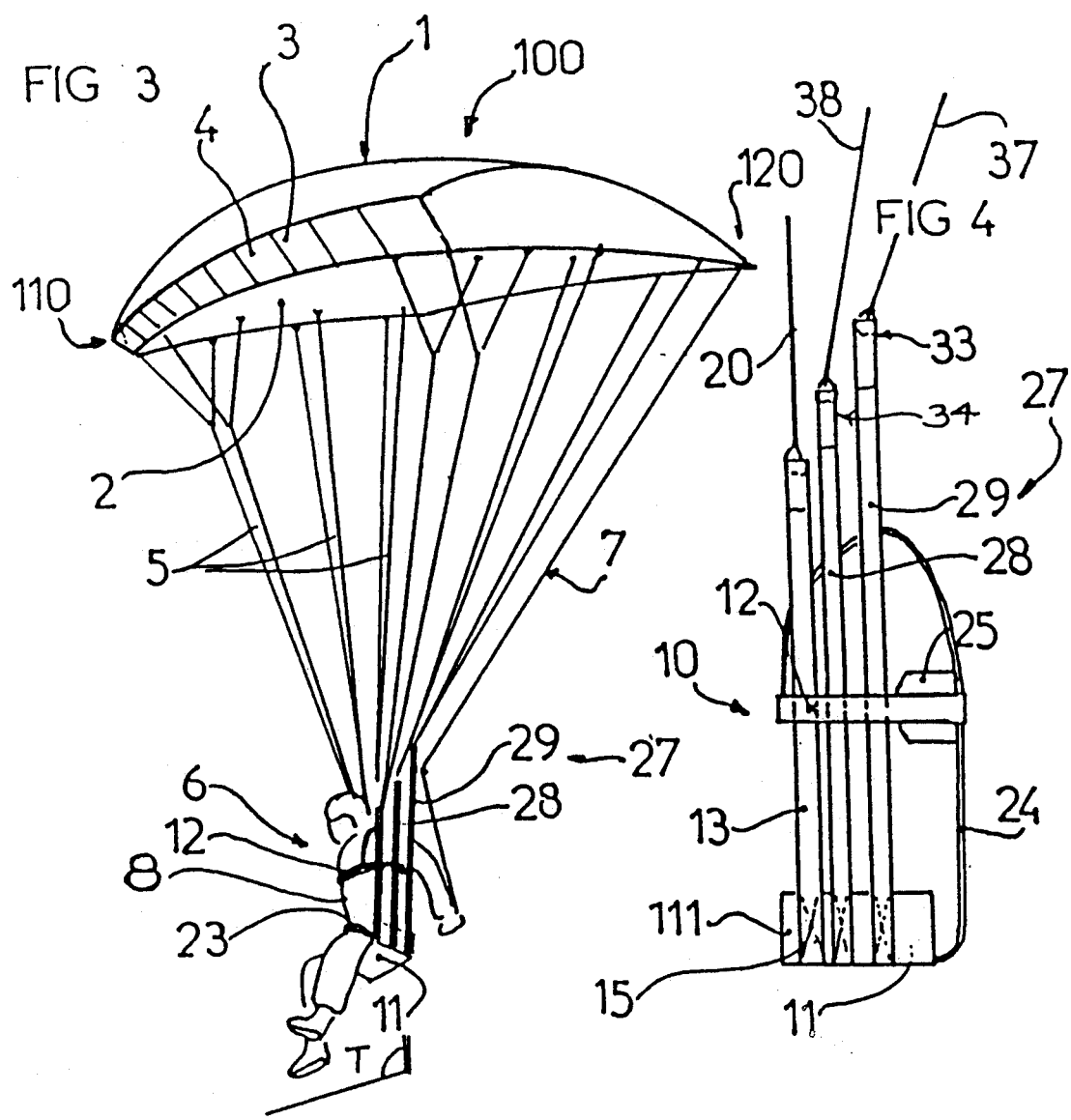
FIG 3
FIG 4

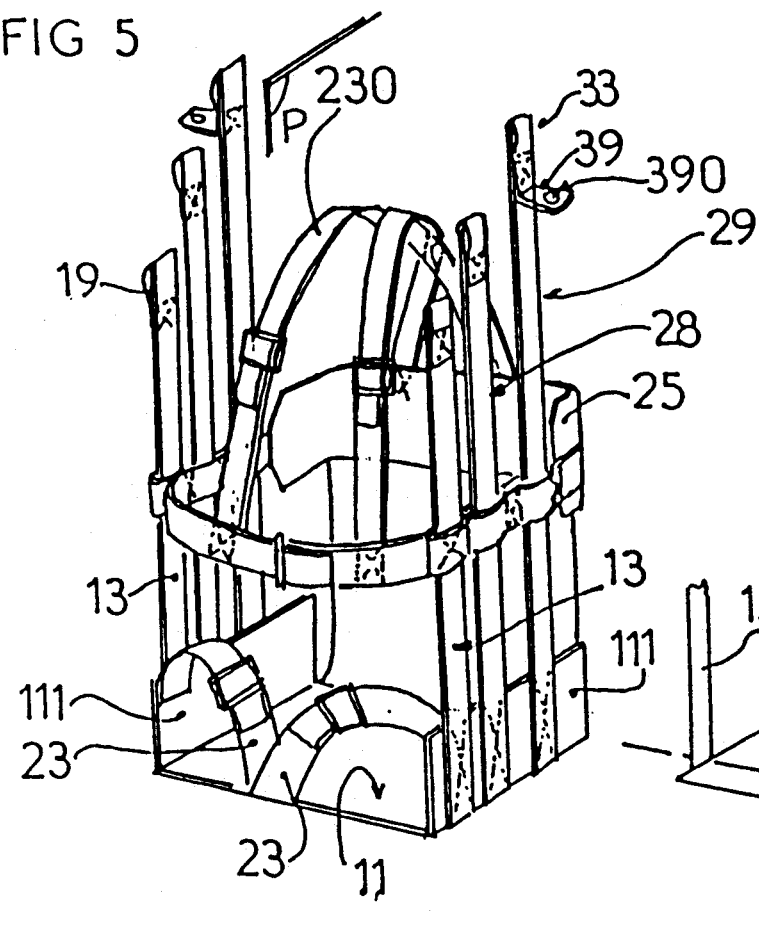
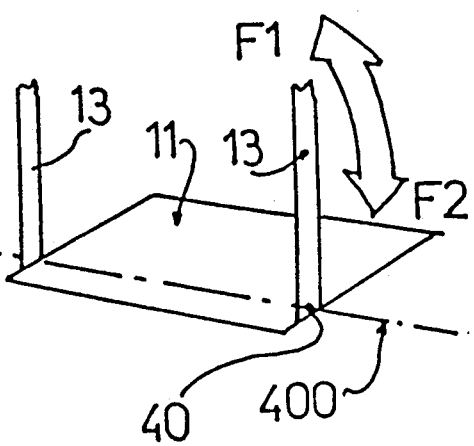
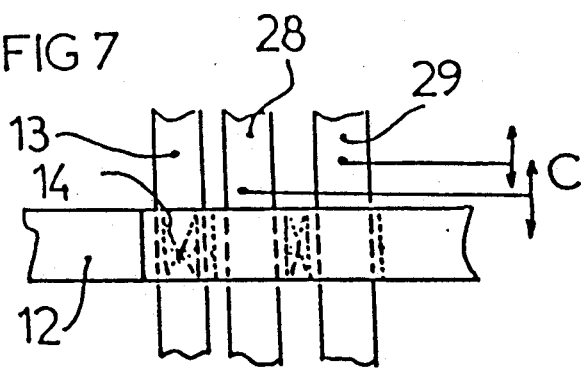
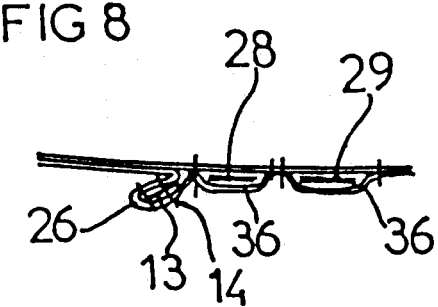
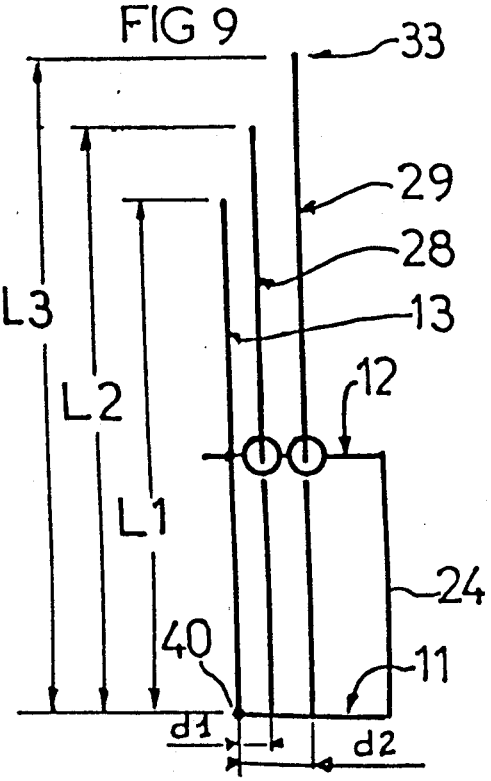

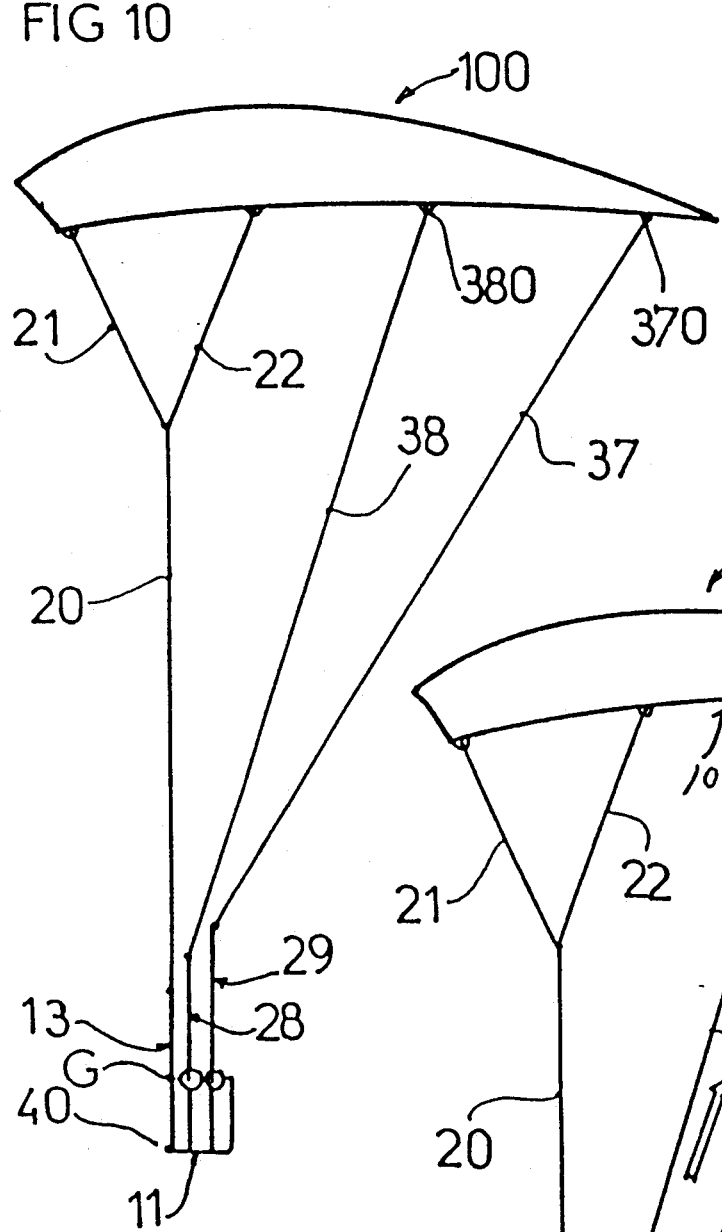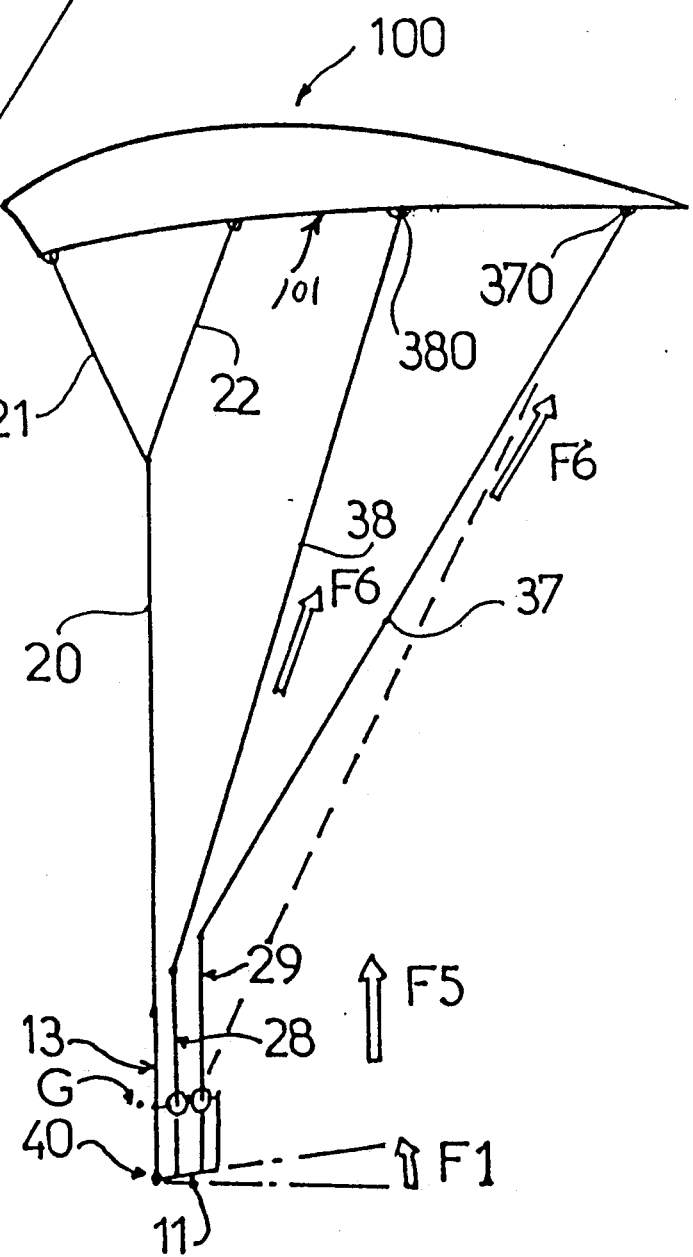

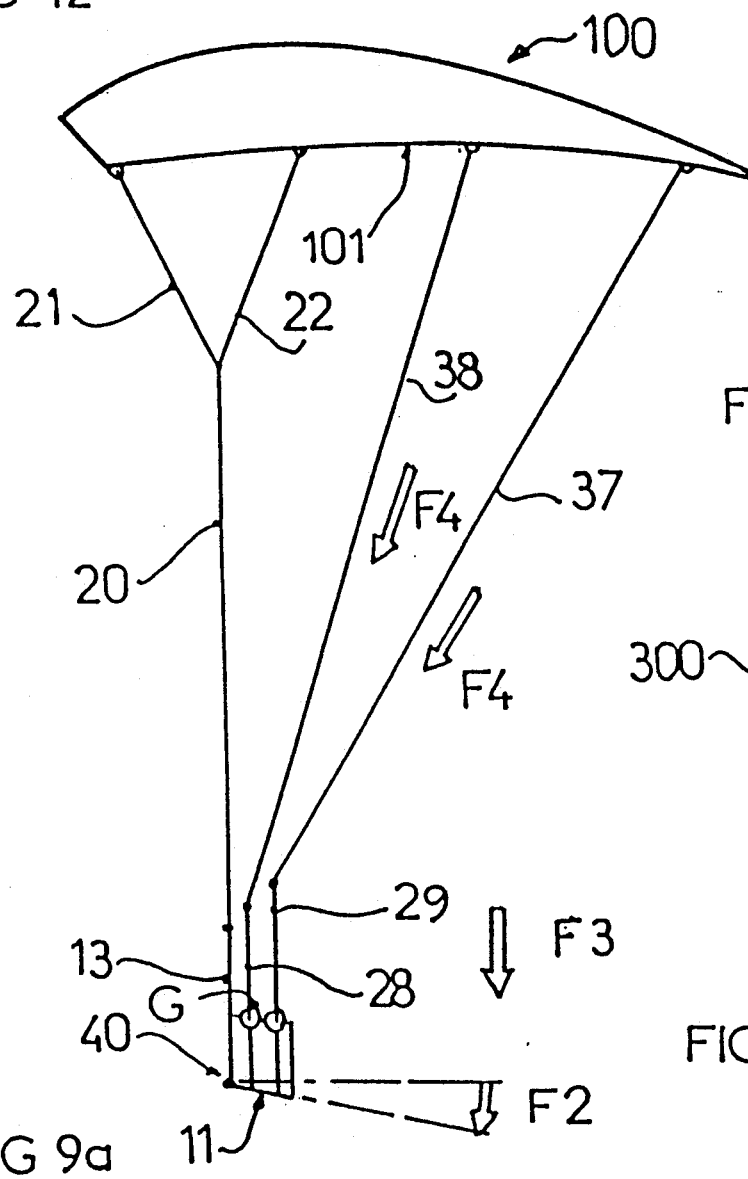
FIG 12
FIG 5a
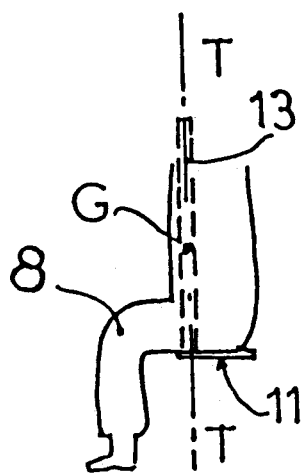
FIG 9a
FIG 13
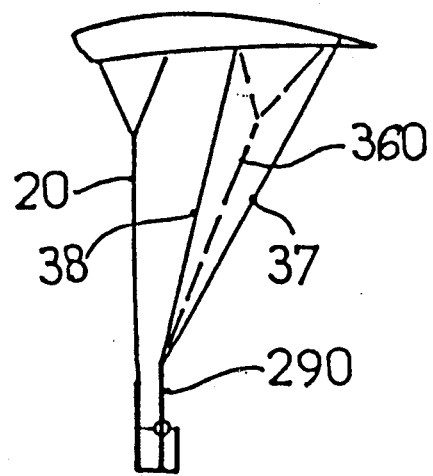

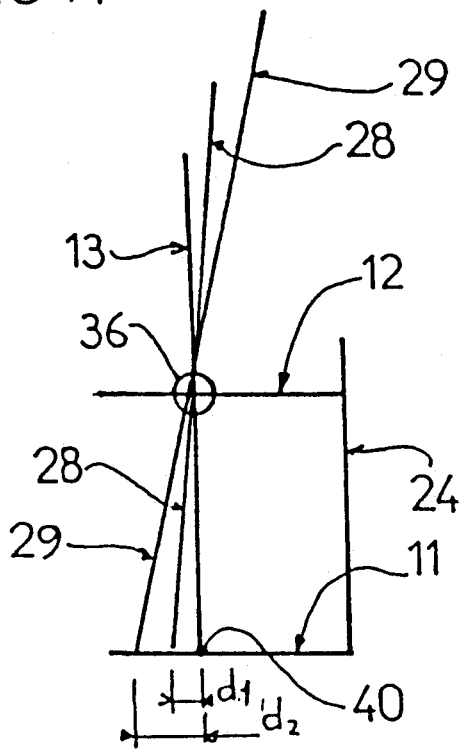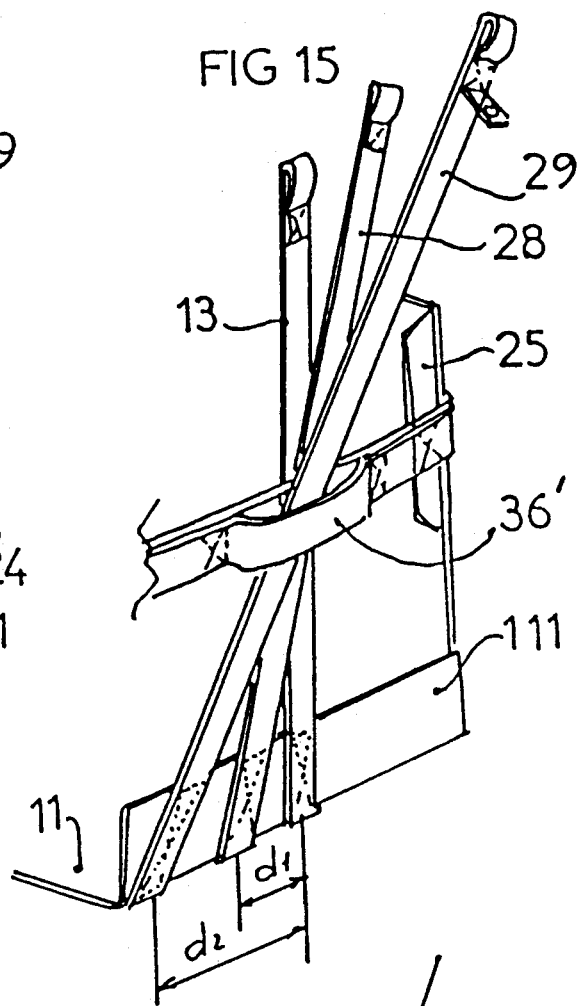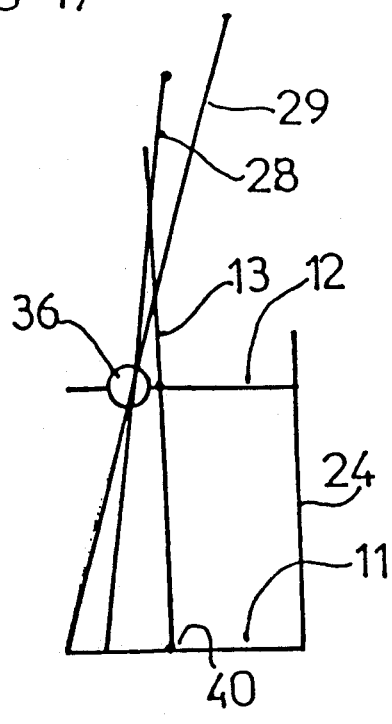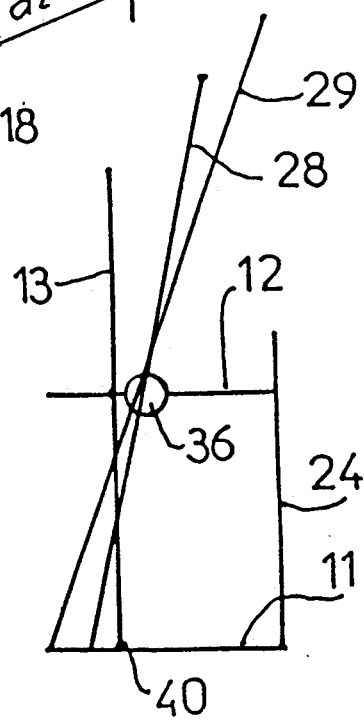

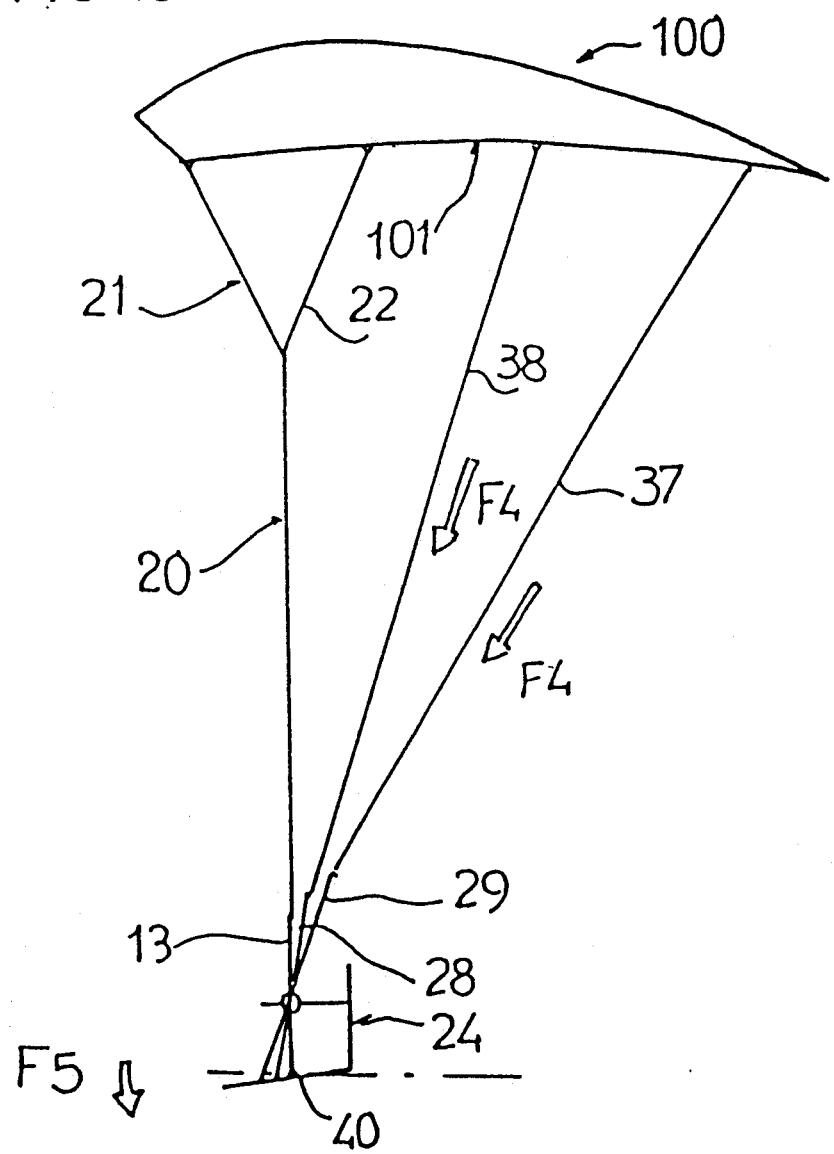

SEAT HARNESS FOR PARACHUTE OF THE TYPE HAVING A FLEXIBLE WING

BACKGROUND OF THE INVENTION

1. Field of the Invention

The present invention relates to a parachute of the type having a flexible wing having casings, presenting a cellular structure constituting a planing wing, generally called a hang glider. It relates more particularly to a seat harness that not only carries the parachutist, but allows the parachutist to pilot the parachute.

2. Discussion of Background and Material Information

Flexible wing parachutes are already known, constituted by a planing wing formed by a flexible upper wall connected to a flexible lower wall by vertical ribs to constitute channels, or casings, of which at least some of them are open towards the front, leading edge. These parachutes include suspending ropes affixed adjacent to the lower wall for the securing of a load, such as a parachutist. The parachutist, by pulling on the control yard-ropes, directs the wing by braking and deformation thereof. Such wings are, for example, described in French patents No. 2,234,188; 2,490,587; as well as in the application filed by Applicant under French Application No. 87 09978.

Such a parachute has a wing profile of a certain thickness, and the air, which penetrates into the open casing at its leading edge gives a shape to the aerodynamic surface and provides a certain rigidity. During descent, the air accumulated in the casing forms a stationary pressure zone at the level of the leading edge, maintaining the shape of the wing, and the assembly acts as a complete wing, which permits the parachutist to glide in the air.

This type of parachute is being used more and more, and has become a very popular sport in mountainous regions. With such parachutes, generally referred to as parapentes the parachutist is suspended from the flexible wing by a retention apparatus which is, either a harness which carries him, or a seat harness which supports him. With the apparatus of the prior art, the only possibility of piloting with an appliance occurs by means of brakes by traction or liberation of the control yard-ropes modifying the geometry of the following or trailing edges of the wing. This type of piloting has a certain number of disadvantages.

The present invention attempts to overcome these disadvantages by proposing a retention apparatus for the parachutist which permits him to modify the aerodynamic surface while nevertheless preserving its maximum lift and its aerodynamic qualities.

SUMMARY OF THE INVENTION

It is an object of the present invention to provide a retention apparatus for a parachute which permits the parachutist to modify the aerodynamic surface while preserving maximum lift and aerodynamic qualities.

The present invention achieves this objective by providing retention apparatus for a parachutist for a parachute of the type having a flexible wing having casings. The retention apparatus includes a retention assembly for retaining the parachutist, and a means for piloting is adapted to permit the parachutist to modify the shape of the aerodynamic surface plane of a parachute by displacement of his center of gravity G. The means for piloting can be associated with the retention assembly.

The retention assembly can include at least one horizontal support or seat, to which is laterally affixed on both sides a vertical strap or principal elevator. In a neutral position, the principal elevators are situated in a transverse vertical plane T passing substantially through the center of gravity G of the parachutist, when the parachutist is retained in said retention assembly.

The means for piloting can include at least one vertical strap or control elevator affixed laterally to the seat, behind the principal elevators at a distance "d" therefrom. Alternatively, the means for piloting can include at least one vertical or control elevator strap affixed laterally to the seat, in front of the principal elevators at a distance "d" therefrom.

A horizontal strap or belt can be affixed on the principal elevators, and the at least one control elevator can be slidably mounted on the belt.

In one embodiment of the invention, two control elevators can be provided on each side of the seat. One being an intermediate control elevator and the other a rear control elevator. In this embodiment of the invention, the intermediate elevators can be longer than the principal elevators, and the rear elevators can be longer than the intermediate elevators. The rear elevators can be affixed to the seat at a distance d2 from the principal elevators such that d2 is greater than two times a distance d1 which separates the intermediate elevators from the principal elevators.

The control elevators can be installed on the retention apparatus so that they cross each other. In this regard, the intermediate elevators and the rear elevators can cross each other at the principal elevators, to the rear of the principal elevators, or in front of the principal elevators.

A dorsal support can connect the seat to the belt affixed to the principal elevators. Further, a front support can be provided which is movable on said seat. This front support is adapted to assume two positions, an inactive retracted position, and an active position extending frontwardly of said seat, to thereby frontwardly extend said seat.

In another embodiment of the invention, a parachute can be equipped with the retention apparatus. Such parachute can include an upper flexible wall or upper surface connected to a flexible lower wall or under surface by substantially vertically ribs defining casings. At least a number of these casings are towards a front, leading edge, and closed at a rear, leakage edge. The lower wall of the parachute can be connected to the retention apparatus by suspending ropes.

In one modification of this embodiment, the principal elevators are connected to front suspending ropes, and at least one control elevator is connected to at least one other suspending rope. In still a further modification of this embodiment, there are two control elevators, an intermediate elevator and a rear elevator, on each side of the seat. The intermediate elevators are connected to intermediate suspending ropes, and the rear elevators are connected to rear suspending ropes. The front suspending ropes can be connected to said lower wall by brace ends.

In similar manner to that described above, the present invention can be described as being directed to a harness for a parachute. The harness includes means includes means for retaining a parachutist attached to the parachute, and means for piloting the parachute to permit the parachutist to modify the shape of the aerodynamic surface plane by displacement of his center of gravity G.

In another embodiment of the present invention, a parachute equipped with a harness for retaining a parachutist is provided. The parachute is provided with a flexible wing having an upper flexible wall, a lower flexible wall and a front, leading edge that permits air to enter the wing for maintaining its aerodynamic shape and to form an aerodynamic surface plane at the lower wall. A harness is attached to the parachute and includes a means for retaining a parachutist. Moreover, means for piloting the parachute are provided which permit the parachutist to modify the shape of the aerodynamic surface plane by displacement of his center of gravity G.

This embodiment of the invention can include any of the previously described features in any combination. For example, in this embodiment, the flexible wing can be provided with substantially vertical ribs forming casings that are open at the leading edge and are closed at a trailing edge; the means for retaining a parachutist can include a seat having laterally spaced sides from which principal elevators extend; the means for piloting can be associated with the means for retaining the parachutist; the means for piloting can include at least one control elevator positioned to extend on said laterally spaced sides of said seat; and, in a neutral position, the principal elevators can be situated in a transverse vertical plane T passing substantially through the center of gravity G of the parachutist.

BRIEF DESCRIPTION OF THE DRAWINGS

Other characteristics, and advantages of the invention will become clear from the description which follows with reference to the annexed drawings, which are given by way of non-limiting/examples only in which:

FIGS. 1 and 2 are perspective views showing a harness according to the prior art;

FIG. 3 is a perspective view showing a parachute equipped with a harness according to the invention;

FIGS. 4-9 illustrate one embodiment of a piloting seat harness according to the invention;

FIG. 4 is a lateral view;

FIG. 5 is a perspective view;

FIG. 5a illustrates an improvement;

FIGS. 6, 7, and 8 illustrate constructional details;

FIGS. 9 and 9a are schematic lateral views;

FIGS. 10, 11, and 12 illustrate the operation of the piloting seat harness;

FIG. 13 illustrates an alternative embodiment;

FIGS. 14, 15, and 16 illustrate another embodiment;

FIG. 14 is a view similar to FIG. 9;

FIG. 15 is a partial view in perspective illustrating one of the sides of the seat;

FIG. 16 is a view similar to FIG. 12; and

FIGS. 17 and 18 illustrate alternative embodiments.

Figure 5B:
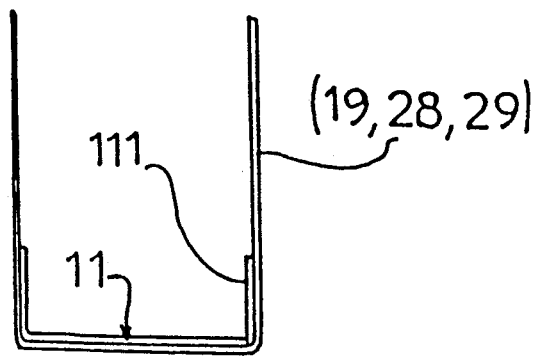
FIGS. 5b and 5c illustrate alternative embodiments.

The parachute adapted to be utilized with the piloting seat harness according to the invention comprises in a manner known in and of itself an upper flexible wall or upper surface 1 connected to a lower flexible wall or under surface 2, by ribs 3 which are substantially vertical defining casings 4, which are referred to as cells or pipes, which are open towards the front or leading edge 110, and closed at the rear or following or trailing edge 120. The air penetrating into casings 4 gives shape to the aerodynamic surface 100, and confers to it a certain rigidity. The parachute additionally comprises suspending ropes 5 connecting the aerodynamic surface to the seat harness 6 adapted to retain the parachutist 8. Furthermore, the parachute comprises control yard-ropes 7 connected to the following or trailing edge 120 permitting the parachutist 8 to deform the following or trailing edge of the wing and thus to direct himself by braking.

FIGS. 1 and 2 illustrate the retention apparatus according to the prior art. FIG. 1 illustrates a parachutist 8 carried by a conventional harness while FIG. 2 illustrates a parachutist supported by a seat harness. In these two embodiments, the piloting of the wing occurs by means of control yard-ropes 7.

FIGS. 3-9 illustrate an embodiment of a retention and piloting apparatus, also called a piloting seat harness according to the invention. This harness comprises both a retention assembly 10 and control means 27. The retention assembly 10, which has a general vertical symmetry plane P, includes a horizontal support or seat 11 having on each side a vertical strap or principal elevator 13 as well as a substantially horizontal lap or belt strap 12. The seat 11 is preferably rigid, and comprises on each side lateral edges 111 extending upwardly. The two principal elevators 13 are affixed at their lower end in front of the seat 11, and more particularly to its lateral edges 111 by stitching 15. On the other hand, belt 12 is affixed to the principal elevator, by virtue of stitching 14. The upper end of the principal elevators 13 comprises a folded and stitched portion 19, to constitute an attachment buckle adapted to retain the lower end of the front suspending ropes 20. As can be seen in FIG. 10, rope 20 preferably includes brace end 21, 22.

Furthermore, the retention assembly 10 can comprise, as is shown by way of example, two thigh straps 23, a dorsal support 24 as well as shoulder straps 230. The dorsal support 24 connects the rear portion of the seat 11 to the rear portion of the belt 12, and comprises lateral extensions 25, so as to increase comfort, and the safety of the retention assembly 10.

The attachment of the principal elevators 13 to the belt 12 can be achieved by virtue of loops 26, within which these pass and are stitched as can be seen particularly in FIGS. 5, 7, and 8.

As was previously indicated, the piloting of the wing according to the invention occurs by virtue of piloting or control means 27 associated with the retention assembly 10 and more particularly at its seat 11.

The control means 27 are constituted, by the vertical or elevator straps 28, 29 affixed on both sides, and at the rear of the seat 11. Preferably, the control elevators 28, 29 are affixed by stitching to the lateral edges 111 of seat 11. The upper ends of the control elevators comprise an affixation buckle 19 making it possible to connect seat 11 to certain suspending ropes, as will be seen below. According to one aspect of the invention, the control elevators, 28 and 29 are slidably mounted with respect to belt 12. To this end, the median portions of the control elevators pass in passages 36 formed on the belt, as is shown in FIGS. 5, 7, and 8.

According to a preferred embodiment of the invention, as illustrated in FIG. 9, the control apparatus 27 comprises on both sides of the retention assembly, an intermediate elevator 28 of length L2, and a rear elevator 29 of length L3. The principal elevators 13 of the retention assembly having a length L1. According to the illustrated embodiment, L1 is shorter than L2 and L2 is shorter than L3. Furthermore, the lower ends of the control elevators are stitched at the rear of seat 11 at respective distances, with respect to the principal elevator 13, of d1 for intermediate elevator 28, and d2 for rear elevator 29. These distances are such that d2 is greater than or equal to two times d1. It should be noted that the upper end 33 of the rear elevators 29 are connected to the lower ends of the rear suspending ropes 37 while the upper ends 34 of the intermediate elevators 28 are connected to the lower ends of the intermediate suspending ropes 38. The rear suspending ropes 37 are connected to the wing at 370, and the intermediate ropes 38 are connected to the wing at 380.

It should also be noted that the upper portion of the rear elevators 29 comprises an extension 39, comprising an eyelet 390 adapted for the passage of the control yard-ropes 7 of the brakes.

The piloting of the wing with the piloting seat harness according to the invention occurs by deformation of the aerodynamic surface, this being obtained by modification of the position of the parachutist, as will be explained below.

The piloting seat harness is shown schematically in FIGS. 9, 10, 11, and 12 and comprises the control elevators, intermediate and rear elevators 28 and 29, which are slidable with respect to belt 12. Accordingly, their relative vertical position with respect to the principal elevators 13 can be varied. The seat 11 is journalled with respect to the principal elevators 13 around a pivoting axis 40 formed by transverse axis 400. This pivoting axis permits seat 11 to pivot upwardly along F1, and downwardly along F2. The pivoting along F1 and F2 is achieved by the parachutist who carries his weight either frontwardly or rearwardly, respectively. During these pivotings, the control elevators 28 and 29 slide vertically. G shows the approximate center of gravity of the parachutist.

In the neutral, inactive position (FIG. 10), and as illustrated in FIG. 9a, the center G is situated substantially in the plane T of the two principal elevators 13.

Rearward rocking of the parachutist (FIG. 12) displaces the center of gravity G towards the rear and makes the seat pivot along F2. The pivoting of seat 11 along F2 around axis 40 causes the downward traction along F3 of the control elevators 28 and 29. This action serves to pull downwardly along F4 on the intermediate suspending ropes 38 and the rear suspending ropes 37, thereby causing the deformation of the lower plane 101 of the aerodynamic surface 100, without deteriorating the lift of the wing which thus preserves its aerodynamic shape.

Frontward rocking of the parachutist (FIG. 11) displaces the center of gravity G towards the front and causes the seat to pivot along F1. The pivoting of the seat along F1 around axis 40 causes the upward liberation along F5 of the control elevators 28 and 29. This action serves in effect to relieve upwardly along F6 the intermediate suspending ropes 38 and rear suspending ropes 37, thus causing the deformation of the lower plane 101 of the aerodynamic surface 100 without deteriorating the lift of the wing which maintains its aerodynamic shape.

Of course, the seat harness according to the invention is not limited to the construction proposed. In effect, it could comprise on each side only a single control elevator 290, as is shown in FIG. 13. In this case the control elevators would be, for example, connected to the intermediate and rearward suspending ropes 38, 37, or suspending ropes 360 extending upwardly by brace ends, as is shown in broken lines.

Moreover, the elevators can be equipped with length adjustment means 300, as is, for example, illustrated in FIG. 5a. It is also noted that it is within the scope of the invention to provide elevators having equal lengths.

FIG. 5b illustrates a preferred embodiment of the invention according to which, to assure better safety, the elevators are continuous and pass under the seat to which they are stitched.

Figure 5C:
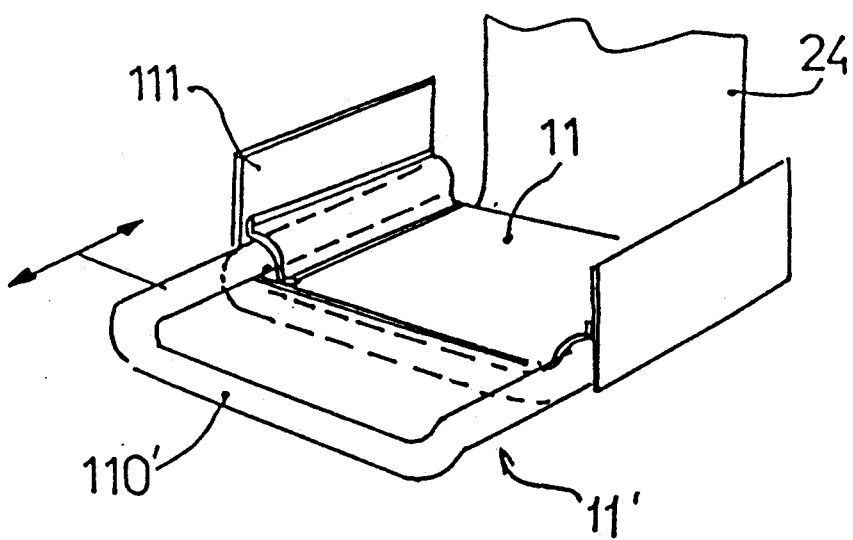

FIG. 5c illustrates an improvement of the seat whereby a movable front support 11' is provided This support, being achieved by a bar 110' sliding on seat 11, can assume two positions; namely, a retracted inactive position shown by dotted lines and an active position shown in solid lines. The inactive retracted position is utilized during the takeoff phase, and the active position, is utilized during flying to permit the pilot to render his frontward rocking much more effective.

FIGS. 14-18 illustrate another embodiment according to which the intermediate control elevators 28 and rearward control elevators 29 are affixed to the lateral portion 111 of seat 11, in a location that is closer to the front of the seat 11 than the principal elevator 13. Thus, the intermediate elevators 28 are affixed to the seat 11 in front of the principal elevators 13 at a distance, "d1", while the rear elevators 29 are affixed at a distance "d2", such that "d2" is greater than "d1". Further, the principal elevators 13 are, as in the preceding embodiment, affixed at median portions to belt 12, while median portions of intermediate elevators 28 and rear elevators 29 are slidably mounted on the belt 12. To this end, the median portions of the control elevators pass in a passage 36', as can be seen more particularly in FIG. 15. The passage 36' is, according to this embodiment, positioned at the location where there are connected the principal elevators to the belt, but it can also be otherwise as is shown in FIGS. 17 and 18. In this regard, in the embodiment of FIG. 17, the control elevators 28 and 29 are slidable on belt 12 in front of the principal elevator 13, and in the embodiment of FIG. 18, the control elevators 28 and 29 are slidable on belt 12 to the rear of the principal elevator 13. The frontward rocking of the parachutist (FIG. 16) displaces frontwardly the center of gravity G and thus makes the seat pivot along F5. The pivoting of the seat along F5, around the axis 40, causes the traction along F4 of the control elevators 28 and 29. This action serves to pull downwardly the intermediate suspending ropes 38 and rearward suspending ropes 37 causing the deformation of the lower plane 101 of the aerodynamic surface 100 without deteriorating the lift of the wing which maintains its aerodynamic shape.

The drawings are schematic representations to better explain the invention. IN reality, and, for example, for FIG. 11, the suspending ropes 37 and elevators 29 would assume the position shown in dotted lines.

FIG. 13 shows a retention apparatus comprising a single control elevator 290 on each side, and the other FIGS. illustrate an apparatus comprising two control elevators 28 and 29; however, it is within the scope of the present invention to provide a number of lateral control elevators that is greater than two.

Of course, the invention is not limited to the embodiments described and shown by way of example, but it can also include all technical equivalents as well as their combinations.

What is claimed is:

1. Retention apparatus for a parachutist for a parachute of the type having a flexible wing having casings, comprising a retention assembly adapted to retain the parachutist, and means for piloting the parachute adapted to permit the parachutist to modify the shape of the aerodynamic surface plane by displacement of his center of gravity G through pivoting movement of the retention assembly.

2. Retention apparatus according to claim 1 wherein the retention assembly comprises at least one horizontal support or seat, to which is laterally affixed on both sides a vertical strap or principal elevator, and said means for piloting are associated with said retention assembly.

3. Retention apparatus according to claim 2, wherein in a neutral position, the principal elevators are situated in a transverse vertical plane T passing substantially through the center of gravity G of the parachutist, when the parachutist is retained in said retention assembly.

4. Retention apparatus according to claim 3, wherein said means for piloting comprise at least one vertical strap or control elevator affixed laterally to the seat, behind the principal elevators at a distance "d" therefrom.

5. Retention apparatus according to claim 3, wherein said means for piloting comprise at least one vertical or control elevator strap affixed laterally to the seat, in front of the principal elevators at a distance "d" therefrom.

6. Retention apparatus according to claim 2, further comprising a substantially horizontal strap or belt affixed on the principal elevators.

7. Retention apparatus according to claim 6, wherein said means for piloting comprise at least one vertical strap or control elevator affixed laterally to the seat, and wherein the at least one control elevator is slidably mounted on the belt.

8. Retention apparatus according to claim 7, wherein there are two control elevators, an intermediate elevator and a rear elevator, on each side of the seat.

9. Retention apparatus according to claim 8, wherein said intermediate elevators are longer than said principal elevators, and said rear elevators are longer than said intermediate elevators.

10. Retention apparatus according to claim 8, wherein said rear elevators are affixed to said seat at a distance d2 from said principal elevators such that d2 is greater than two times a distance d1 which separates said intermediate elevators from said principal elevators.

11. Retention apparatus according to claim 8, wherein said intermediate elevators and said rear elevators cross laterally at said principal elevators.

12. Retention apparatus according to claim 8, wherein said intermediate elevators and said rear elevators cross laterally to the rear of said principal elevators.

13. Retention apparatus according to claim 8, wherein said intermediate elevators and said rear elevators cross laterally in front of said principal elevators.

14. Retention apparatus according to claim 6, wherein said retention assembly further comprises a dorsal support connecting said seat to said belt affixed to said principal elevators.

15. Retention apparatus according to claim 14, further comprising a front support movable on said seat adapted to assume two positions, an inactive retracted position, and an active position extending frontwardly of said seat, to thereby frontwardly extend said seat.

16. Parachute equipped with the retention apparatus according to claim 7, comprising an upper flexible wall or upper surface connected to a flexible lower wall or under surface by substantially vertical ribs defining casings, at least a number of these casings being open towards a front, leading edge, and closed at a rear, leakage edge; and the lower wall of the parachute being connected to the retention apparatus by suspending ropes.

17. Parachute according to claim 16, wherein the principal elevators are connected to front suspending ropes, and at least one control elevator is connected to at least one other suspending rope.

18. Parachute according to claim 17, wherein there are two control elevators, an intermediate elevator and a rear elevator, on each side of the seat; and wherein said intermediate elevators are connected to intermediate suspending ropes, and said rear elevators are connected to rear suspending ropes.

19. Parachute according to claim 18, wherein said front suspending ropes are connected to said lower wall by brace ends.

20. Harness for a parachute comprising means for retaining a parachutist attached to a parachute having an aerodynamic surface plane, and means for piloting the parachute adapted to permit the parachutist to modify the shape of the aerodynamic surface plane by displacement of his center of gravity G through pivoting movement of said means for retaining a parachutist.

21. The harness according to claim 20, wherein said means for retaining a parachutist include a seat having laterally spaced sides from which principal elevators extend.

22. The harness according to claim 21, wherein said means for piloting are associated with said means for retaining a parachutist.

23. The harness according to claim 22, wherein said means for piloting comprise at least one control elevator positioned to extend on said laterally spaced sides of said seat.

24. The harness according to claim 23, wherein, in a neutral position, the principal elevators are situated in a transverse vertical plane T passing substantially through the center of gravity G of the parachutist.

25. The harness according to claim 24, wherein the at least one control elevator is laterally affixed to the seat, with respect to a front area of the seat, a distance "d" behind the principal elevators, and extending upwardly on both sides of the seat.

26. The harness according to claim 24, wherein the at least one control elevator is laterally affixed to the seat, with respect to a front area of the seat, a distance "d" in front of the principal elevators.

27. The harness according to claim 24, further comprising a substantially horizontal strap affixed on the principal elevators.

28. The harness according to claim 27, wherein the at least one control elevator is slidably mounted on the strap.

29. The harness according to claim 28, wherein there are two control elevators extending on lateral sides of said seat forming intermediate elevators and rear elevators.

30. The harness according to claim 29, wherein said intermediate elevators are longer than said principal elevators, and said rear elevators are longer than said intermediate elevators.

31. The harness according to claim 30, wherein said rear elevators are affixed to said seat at a distance d2 from said principal elevators such that d2 is greater than two times a distance d1 which separates said intermediate elevators from said principal elevators.

32. The harness according to claim 29, wherein said intermediate elevators and said rear elevators cross laterally at said principal elevators.

33. The harness according to claim 29, wherein said intermediate elevators and said rear elevators cross laterally to the rear of said principal elevators.

34. The harness according to claim 29, wherein said intermediate elevators and said rear elevators cross laterally in front of said principal elevators.

35. The harness according to claim 30, wherein said retention assembly further comprises a dorsal support connecting said seat to said strap affixed to said principal elevators.

36. The harness according to claim 30, further comprising a front support movable on said seat adapted to assume two positions, an inactive retracted position, and an active position extending frontwardly of said seat, to thereby frontwardly extend said seat.

37. Parachute equipped with a harness for retaining a parachutist comprising:
a parachute comprising a flexible wing having an upper flexible wall, a lower flexible wall and a front, leading edge that permits air to enter the wing for maintaining its aerodynamic shape and to form an aerodynamic surface plane at the lower wall; and
a harness attached to the parachute comprising:
means for retaining a parachutist, said means for retaining being attached to the parachute; and
means for piloting the parachute adapted to permit the parachutist to modify the shape of the aerodynamic surface plane by displacement of his center of gravity G through pivoting movement of said means for retaining a parachutist.

38. The parachute according to claim 37, wherein said flexible wing includes substantially vertical ribs forming casings, which casings are open at the leading edge and are closed at a rear, trailing edge.

39. The parachute according to claim 38, wherein the means for retaining a parachutist comprise a seat having laterally spaced sides from which principal elevators extend; said means for piloting are associated with the means for retaining a parachutist; said means for piloting comprise at least one control elevator positioned to extend on said laterally spaced sides of said seat; and, in a neutral position, the principal elevators are situated in a transverse vertical plane T passing substantially through the center of gravity G of the parachutist.

40. The parachute according to claim 39, wherein the at least one control elevator is laterally affixed to the seat, with respect to a front area of the seat, a distance "d" behind the principal elevators, and extending upwardly on both sides of the seat.

41. The parachute according to claim 39, wherein the at least one control elevator is laterally affixed to the seat, with respect to a front area of the seat, a distance "d" in front of the principal elevators.

42. The parachute according to claim 39, further comprising a substantially horizontal strap affixed on the principal elevators.

43. The parachute according to claim 39, wherein the at least one control elevator is slidably mounted on said substantially horizontal strap.

44. The parachute according to claim 43, wherein there are two control elevators extending on lateral sides of said seat forming intermediate elevators and rear elevators.

45. The parachute according to claim 44, wherein said intermediate elevators are longer than said principal elevators, and said rear elevators are longer than said intermediate elevators.

46. The parachute according to claim 45, wherein said rear elevators are affixed to said seat at a distance d2 from said principal elevators such that d2 is greater than two times a distance d1 which separates said intermediate elevators from said principal elevators.

47. The parachute according to claim 44, wherein said intermediate elevators and said rear elevators cross laterally at said principal elevators.

48. The parachute according to claim 44, wherein said intermediate elevators and said rear elevators cross laterally to the rear of said principal elevators.

49. The parachute according to claim 44, wherein said intermediate elevators and said rear elevators cross laterally in front of said principal elevators.

50. The parachute according to claim 42, further comprising a dorsal support connecting said seat to said substantially horizontal strap affixed to said principal elevators.

51. The parachute according to claim 39, further comprising a front support movable on said seat adapted to assume two positions, an inactive retracted position, and an active position extending frontwardly of said seat, to thereby frontwardly extend said seat.

52. The parachute according to claim 39, wherein the principal elevators are connected to front suspending ropes, and said at least one control elevator is connected to at least one other suspending rope.

53. The parachute according to claim 52, wherein there are two control elevators extending on lateral sides on said seat forming intermediate elevators and rear elevators; and wherein said intermediate elevators are connected to intermediate suspending ropes, and said rear elevators are connected to rear suspending ropes.

54. The parachute according to claim 53, wherein said front suspending ropes are connected to said lower surface plane by brace ends.

55. Retention apparatus for a parachutist for a parachute of the type having a flexible wing having casings, comprising a retention assembly including seat means for retaining the parachutist, and means for piloting the parachute including at least one vertical control elevator affixed to said seat means adapted to permit the parachutist to modify the shape of the aerodynamic surface plane by displacement of his center of gravity G through pivoting movement of said seat.

56. Harness for a parachute comprising means for retaining a parachutist attached to a parachute having an aerodynamic surface plane, said means for retaining including a seat; and means for piloting the parachute including at least one vertical control elevator affixed to said seat adapted to permit the parachutist to modify the shape of the aerodynamic surface plane by displacement of his center of gravity G through pivoting movement of said means for retaining a parachutist.

57. Parachute equipped with a harness for retaining a parachutist comprising:

a parachute comprising a flexible wing having an upper flexible wall, a lower flexible wall and a front, leading edge that permits air to enter the wing for maintaining its aerodynamic shape and to form an aerodynamic surface plane at the lower wall; and a harness attached to the parachute comprising:

means for retaining a parachutist including a seat, said means for retaining being attached to the parachute; and means for piloting the parachute including at least one vertical control elevator affixed to said seat adapted to permit the parachutist to modify the shape of the aerodynamic surface plane by displacement of his center of gravity G through pivoting movement of said means for retaining a parachutist.

* * * * *